June 15, 1943.  W. R. WEST  2,321,719
GASEOUS FUEL MIXER
Filed June 27, 1941
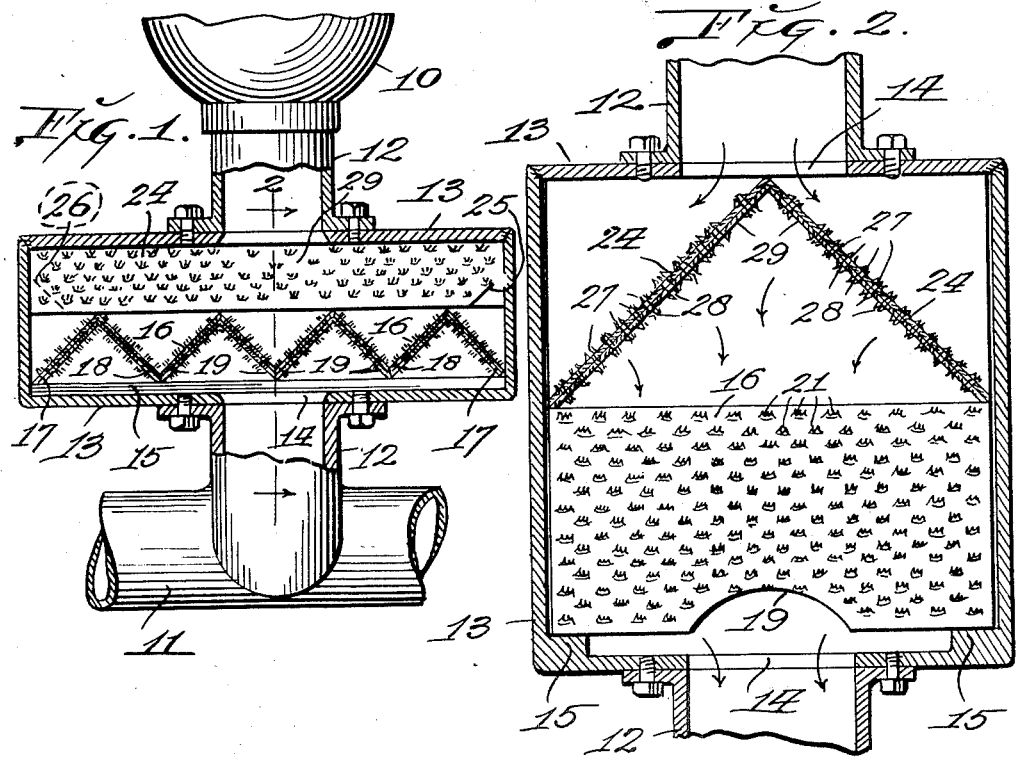
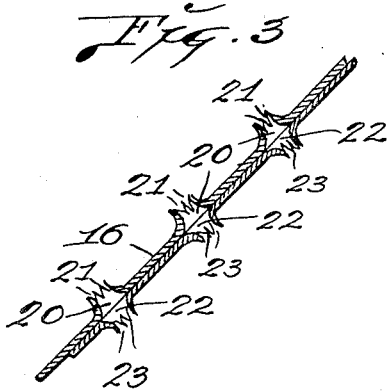
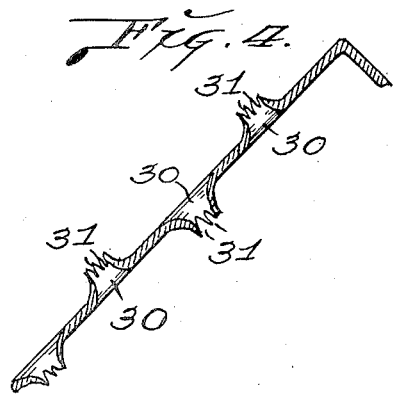
INVENTOR:—
WM. R. WEST.
By Martin P. Smith ATTY.

Patented June 15, 1943

2,321,719

UNITED STATES PATENT OFFICE 2,321,719

GASEOUS FUEL MIXER

William R. West, Montebello, Calif.

Application June 27, 1941, Serial No. 400,139

2 Claims. (Cl. 48—180)

My invention relates to a gaseous fuel mixing device and has for its principal object, the provision of a relatively simple, practical, and inexpensive structure designed to be located in the conduit from the conventional carbureter to the intake manifold of an internal combustion engine, and the construction of the device being such as to bring about complete gasification of the carbureted mixture before it enters the intake manifold and the engine cylinders, thus insuring material increase of power when the compressed fuel charges are ignited within the combustion chambers of the engine and minimizing the production of the carbon that usually attends the combustion of carbureted liquid hydrocarbon.

A further object of my invention is, to provide a gaseous fuel mixing device which in service will in no wise act as a choke or baffle for the carbureted mixture as it passes from the carbureter through the mixing device to the intake manifold, and further, to construct the mixing device so that it will automatically function to reduce and equalize any pressure that may develop in the gaseous fuel as it flows from the carbureter to the intake manifold.

A further object of my invention is, to provide a gaseous fuel mixer of the character referred to that comprises but few parts that are rigidly positioned within a housing and said parts being provided with small apertures, each surrounded by sharp burrs that are formed from the metal by the tool used in punching the apertures and which burrs are highly effective in breaking up the gaseous fuel as it passes through the apertures.

A further object of my invention is, to provide a gaseous fuel mixer that will enable internal combustion engines to be operated with decided economic advantage with the cheaper grades of gasoline, distillate, and kerosene. In this connection, repeated tests and experiments have demonstrated the fact that the cheaper grades of liquid hydrocarbon may be converted into gaseous fuel that will function with equal advantage and with the same amount of power as high grade gasoline or liquid hydrocarbon that has been treated with lead and without the development of engine "ping" or pounding.

With the foregoing and other objects in view, my invention consists in certain novel features of construction and arrangement of parts that will be hereinafter more fully described and claimed and illustrated in the accompanying drawing in which:

Fig. 1 is a vertical longitudinal section taken through the center of a gaseous fuel mixer constructed in accordance with my invention and showing the same associated with a carbureter and the intake manifold of an internal combustion engine.

Fig. 2 is an enlarged cross section taken on the line 2—2 of Fig. 1.

Fig. 3 is an enlarged detail section of a portion of one of the walls of the perforated members that are located on the interior of the mixing device.

Fig. 4 is a sectional view similar to Fig. 3 and showing a modified form of the perforated wall.

Referring by numerals to the accompanying drawing which illustrates a preferred embodiment of my invention, 10 designates the conventional carbureter of an internal combustion engine and leading therefrom to the intake manifold 11 of the engine is a duct 12. In order to accommodate my improved mixing device, this duct is formed in two parts, the upper part depending from the carbureter and the lower part projecting upwardly from the intake manifold.

The mixer of my invention includes a housing 13, preferably rectangular in form and which is arranged between and suitably connected to the ends of the members of duct 12. Formed in the top and bottom walls of the housing 13 are openings 14 that communicate with the passageways through the members forming the duct 12.

Formed integral with or fixed to the bottom wall of the housing on the top thereof and adjacent the front and rear walls are longitudinally disposed ribs 15 and supported thereon with their lower edges spaced a short distance above the upper face of the bottom wall of the housing are transversely disposed inverted V-shaped members 16, preferably formed of thin sheet metal, and each member comprising two thin walls, one lying directly on top of the other.

In the drawing I have shown four of these elements 16 in the lower portion of the housing, but it will be understood that this number may be increased or decreased in accordance with different requirements.

The bilateral parts of these members 16 are disposed substantially ninety degrees apart and their apices occupy a horizontal plane approximately half way between the top and bottom plates of housing 13. Formed in the central portions of the outer walls of the outer members 16 or those walls that are immediately adjacent the end walls of the housing 13, are inverted V-shaped notches 17, and formed in the lower edges of the inner walls of the outer pair of inverted V-shaped members are segmental notches 18, the area of the latter notches being considerably greater than the area of the notches 17.

Formed in the lower edges of the walls of the intermediate inverted V-shaped members 16 midway between the ends thereof are segmental notches 19 that are practically identical in size with the notches 18.

The notches 17 and 19 just described together with notches formed in the ends of the perforated element that is located in the upper half of the housing 13, in addition to providing for a uniform flow and for directing such flow through the chamber within the housing and which chamber is occupied by the perforated elements, function as bleeds to counteract and equalize any undue pressures that may develop within the housing of the device.

The overlying sheet of thin metal of each element 16 is provided throughout its entire area with small apertures 20 that are formed by punching the sheet metal upwardly with a suitable tool and the material that is punched upwardly as the result of the formation of said apertures, forms a substantially circular upwardly projecting burr 21 composed of a number of sharp attenuated points.

The underlying sheet of thin metal forming a part of each inverted V-shaped element 16 is provided throughout its entire area with apertures 22 formed with a suitable punch and as a result of the formation of said apertures, the material adjacent each aperture forms a downwardly presented burr 23 composed of sharp attenuated metal points.

The apertures 20 and 22 in the sheets of metal forming the elements 16 are disposed directly opposite each other in order that gaseous fuel may flow through said apertures and in entering and leaving said apertures, the gaseous fuel impinges against the burrs 21 and 23 so as to be effectively broken up and further gasified.

The apertures 20 and 22 with their surrounding burrs 21 and 23 are similar to the perforations and burrs of culinary utensils such as nutmeg and vegetable graters.

Positioned within the upper half of the chamber within the housing 13 is an inverted V-shaped member 24 composed of two thin sheets of metal, one lying immediately on top of the other, and the lower edges of this member bear on the ends of the apices of members 16 immediately adjacent the front and rear walls of the housing, with the apex of said member 24 positioned immediately beneath the top wall of the housing midway between the front and rear walls thereof.

The lower corner at one end of one of the walls of member 24 is cut away to form an opening 25 and the opposite end of the other wall is likewise cut away to form a similar opening 26. These openings 25 and 26 cooperate with the openings 17 and 19 that are formed in the walls of the lower row of perforated members 16 in controlling the flow of gaseous fuel through the device and likewise for counteracting undue pressures that might otherwise develop within the mixer.

The overlying sheet of metal forming the upper member 24 is punched upwardly to form small apertures, each surrounded by a substantially circular burr 27, and in like manner the underlying sheet of metal forming the element 24 is provided with apertures, each surrounded by a downwardly projecting burr 28.

A substantially circular area 29 at the center of the upper element 24 or that portion of said element that is immediately beneath the end of that portion of the duct 12 that leads from the carburetor to the housing 13, is provided with only a few perforations, and as a result of such arrangement the greater portion of the gaseous fuel discharging into the housing from the duct is baffled and caused to pass radially outward in all directions over the perforated walls of the upper member.

Due to the suction produced in the intake manifold by the pistons operating within the engine cylinders, the gaseous mixture is drawn from the carburetor downwardly into the upper portion of the chamber within the housing 13 and after flowing over the upper surfaces of the upper perforated element 24 passes downwardly through the apertures in said upper perforated element and in so doing the mixture impinges the burrs 27 and 28 so as to be further broken up and gasified.

From the chamber beneath the upper perforated element 24, the gaseous fuel flows downwardly over the inclined surfaces of the lower perforated members 16 and in passing through the registering apertures 20 and 22, said mixture impinges against and is further broken up and gasified by contact with the burrs 21 and 23.

From the chambers beneath the perforated members 16 the fuel in highly gasified condition discharges through the lower one of the openings 14 into the intake manifold.

Thus the gaseous fuel in a highly gasified and mixed condition enters the combustion chambers of the engine and is ignited therein so as to produce maximum power without the undesirable ping and knock and without the formation of carbon, which latter as is well known materially cuts down engine efficiency.

By providing a mixing device that enables low grade and inexpensive liquid hydrocarbons to be utilized as fuel, brings about a very desirable feature of internal combustion engine operation, namely, the counteracting of the abnormally high temperatures that ordinarily attend the use of high grade fuels or those that have been treated with lead or the like.

The combined area of the apertures formed in the perforated members 16 and 24 is considerably greater than the area of the passageway through the member 12 that leads from the carbureter to the intake manifold and thus the mixing device does not in any way choke or retard the flow of gaseous fuel from the carbureter to the manifold and any tendency of undue pressures to develop within the housing is counteracted by the openings 17, 18, 19, and 25 which function as bleeds or pressure relief openings.

In Fig. 4 I have illustrated a modified construction wherein the inverted V-shaped members are each formed from a single sheet of thin metal, the same being perforated to form minute apertures 30, each surrounded by an annular burr 31, and with the burrs of certain of the apertures projecting outwardly and upwardly and the burrs on the other apertures projecting inwardly and downwardly.

Thus it will be seen that I have provided a gaseous fuel mixing device that is relatively simple in construction, inexpensive of manufacture and very effective in performing the functions for which it is intended.

It will be understood that minor changes in the size, form and construction of the various parts of my improved gaseous fuel mixer, may be made and substituted for those herein shown and described, without departing from the spirit of my invention, the scope of which is set forth in the appended claims.

I claim as my invention:

1. In a gaseous fuel mixing device, a housing provided with inlet and outlet openings, a plurality of inverted V-shaped members transversely disposed within the lower portion of the chamber within said housing each inverted V-shaped member comprising a pair of identical walls disposed one above and in direct contact with the other, the lower edges of which members are elevated with respect to the bottom of the housing, the upper wall of each inverted V-shaped member being provided with apertures, upwardly projecting burrs surrounding said apertures the lower wall of each inverted V-shaped member being provided with apertures and with downwardly projecting burrs surrounding said apertures, an inverted V-shaped member within the upper portion of the chamber within said housing and disposed at right angles to the first mentioned inverted V-shaped members said last mentioned inverted V-shaped member comprising a pair of identical walls, one disposed above and in direct contact with the other, the upper wall of said last mentioned upper inverted V-shaped member being provided with perforations and upwardly projecting burrs surrounding said perforations and the lower wall of said last mentioned inverted V-shaped member being provided with perforations and with downwardly projecting burrs surrounding said perforations.

2. A gaseous fuel mixing device as set forth in claim 1 and the walls of all of said inverted V-shaped members being provided with pressure relief openings.

WILLIAM R. WEST.